United States Patent [19]
Voitik

[11] 3,945,650
[45] Mar. 23, 1976

[54] LIP SEAL ASSEMBLY

[75] Inventor: Robert M. Voitik, Glenview, Ill.

[73] Assignee: Innovatex Corporation, Glenview, Ill.

[22] Filed: Sept. 18, 1974

[21] Appl. No.: 507,225

[52] U.S. Cl. .............................................. 277/165
[51] Int. Cl.² ........................................ F16J 15/32
[58] Field of Search ............................ 277/165, 188

[56] References Cited
UNITED STATES PATENTS

| | | | |
|---|---|---|---|
| 3,771,801 | 11/1973 | Burke | 277/165 |
| 3,774,920 | 11/1973 | Sieuenpiper | 277/165 |
| 3,806,134 | 6/1971 | Scheinayder | 277/165 |
| 3,817,517 | 6/1974 | Lundquist | 277/165 |

*Primary Examiner*—Robert I. Smith
*Attorney, Agent, or Firm*—Edward U. Dithmar

[57] ABSTRACT

A lip seal assembly establishing a sealed relationship between two spaced relatively movable members wherein one of the members has a pair of adjacent annular recesses of different effective diameters. An annular lip seal element of resilient material is disposed in one of the annular recesses, the element having an annular lip portion extending across the space between members into engagement with the other member and establishing a seal therewith due to deformation of the lip portion. An O-ring of resilient material is disposed in the other annular recess, the O-ring exerting bias pressure on the lip seal element to hold the element in sealed relation with the associated member and to maintain the annular lip portion in sealing engagement with the other member.

5 Claims, 5 Drawing Figures

LIP SEAL ASSEMBLY

BACKGROUND OF THE INVENTION

This invention relates to a lip seal assembly for establishing a sealed relationship between two spaced relatively movable members, for example (1) a housing member and a rotatable or sliding shaft member, (2) a central shaft member and a surrounding inner cylindrical surface formed in another member and (3) a pair of spaced plate members.

One object of the invention is to provide a lip seal assembly for use between two relatively movable spaced members wherein an annular lip seal element of resilient material is held in sealed relation with one of the members by means of an O-ring of resilient material which performs the multiple functions of holding the lip seal element in sealed relation with its associated member, of maintaining an annular edge lip portion of the lip seal element in sealing engagement with the other member and of permitting easy removal and replacement of the lip seal element and O-ring if circumstances warrant.

Another object is to provide a lip seal assembly employing an annular lip seal element of resilient material and an O-ring of resilient material, the O-ring exerting bias pressure on the lip seal element to insure a continuing sealed relationship between the respective parts of the assembly. The O-ring, preferably formed of an elastomer, tends to swell with time in the presence of oil such as commonly is used with seals of this type, the swelling of the O-ring being effective to increase bias pressure, thereby compensating for wear and shape change of the lip seal element.

SUMMARY OF THE INVENTION

The invention resides in a lip seal assembly comprising a first member, a second member, means mounting the members for relative movement in spaced relation, one of the members having a pair of adjacent annular recesses of different effective diameters, an annular lip seal element of resilient material disposed in one of the annular recesses in the one member and having an annular edge lip portion extending into engagement with the other member in sealing manner due to deformation of the edge lip portion, and an O-ring of resilient material disposed in the other annular recess and exerting bias pressure on the annular lip seal element to hold the element in sealed relation with the one member and to maintain the annular edge lip portion in sealing engagement with the other member.

In more detailed aspect, the member of the assembly having the pair of adjacent annular recesses has an annular flange at the entrance to the annular recess containing the O-ring, whereby the O-ring is secured in the recess and is effective to retain all parts in assembled relation.

In a commercial lip seal assembly embodying the invention, Teflon plastic material and Viton elastomer have been found highly satisfactory for the annular lip seal element and O-ring, respectively.

DESCRIPTION OF THE PREFERRED EMBODIMENTS

Figure 1:
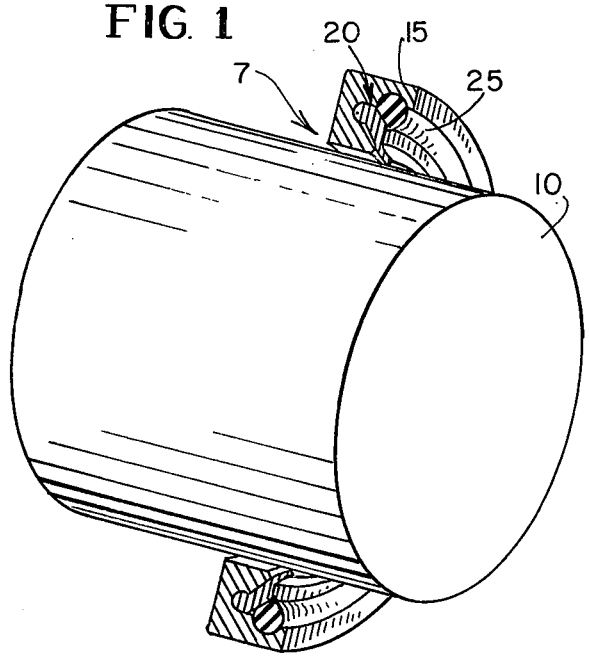
FIG. 1 is a perspective view, partly in cross-section, showing one form of lip seal assembly embodying the invention.
Figure 2:
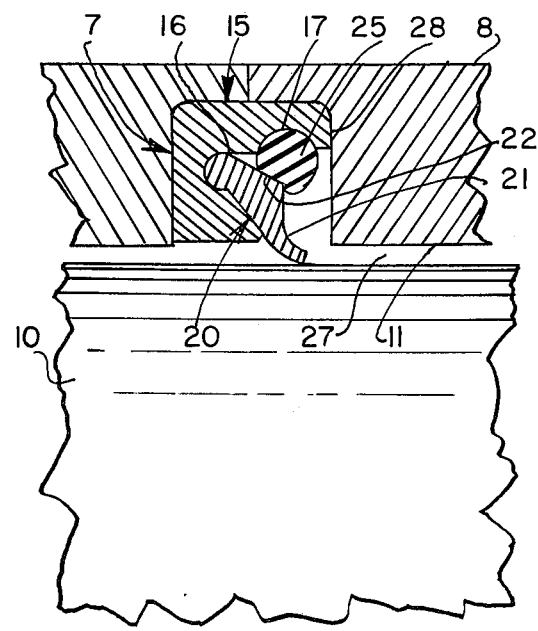
FIG. 2 is a fragmentary cross-sectional view of the lip seal assembly shown in FIG. 1.

Referring to the drawing, FIGS. 1 and 2 show a lip seal assembly 7 embodying a form of the invention adapted to be mounted in a housing 8 (FIG. 2) to establish a seal between housing 8 and a spaced movable shaft 10 extending through an opening 11 in the housing.

Shaft 10 is mounted by suitable means (not shown) such as conventional bearings so as to have concentric relation with housing opening 11, the shaft being subject to rotary movement, longitudinal movement or both.

An annular member 15 secured to housing 8 (FIG. 2) constitutes one member of lip seal assembly 7, and shaft 10 constitutes another member of the assembly in the form shown in FIGS. 1 and 2.

One of the members 10 or 15, for example member 15 in FIG. 2, has a pair of adjacent annular recesses 16 and 17 of different effective diameters. As shown, recess 16 has the smaller diameter and recess 17 has the larger diameter.

An annular lip seal element 20 of irregular cross-sectional shape and made of resilient material such as Teflon plastic material is disposed in annular recess 16 of member 15, the lip seal member having an annular edge lip portion 21 extending into engagement with shaft 10. Annular edge lip portion 21 is of such diameter that it is deformed slightly when engaging shaft 10 so the seal element establishes a seal with shaft 10.

Annular lip seal element 20 has a conical surface 22 in effective relation with an O-ring which next will be described.

An O-ring 25 of resilient material such as Viton elastomer is disposed in the other annular recess 17, a portion of O-ring 25 engaging conical surface 22 of lip seal element 20. The shape, size and location of recess 17 and the size of resilient O-ring 25 are such that O-ring 25 is deformed at the point of engagement with conical surface 22 of lip seal element 20. Thus, O-ring 25 exerts a bias pressure on lip seal element 20 and holds element 20 in sealed relation with member 15. This pressure also is effective to maintain annular edge lip portion 21 of lip seal element 20 in sealing engagement with shaft 10. This is significant in view of the tendency of lip seal element 20 to change shape with the passage of time and possible wear at the point of engagement between edge lip portion 21 and shaft 10.

Still referring to FIG. 2, space 27 on the right side of lip seal assembly 7 is the space containing the medium at higher pressure intended to be sealed by the assembly. Pressure applied from this space on annular lip portion 21 tends to tighten the seal between lip seal element 20 and shaft 10.

Member 15, as shown in FIG. 2, has an annular flange 28 at the entrance to recess 17 which receives O-ring 25, whereby O-ring 25 is secured in recess 17 and is effective to retain all parts of lip seal assembly 7 in assembled relation.

Figure 3:
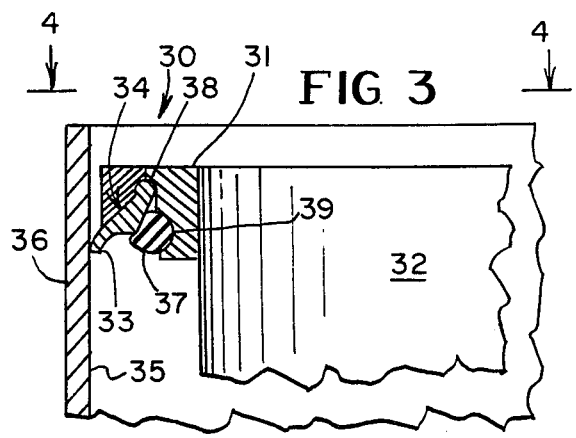
FIG. 3 is a fragmentary elevational view, partly in cross-section on line 3—3 of FIG. 4, of another form of lip seal assembly embodying the invention.
Figure 4:
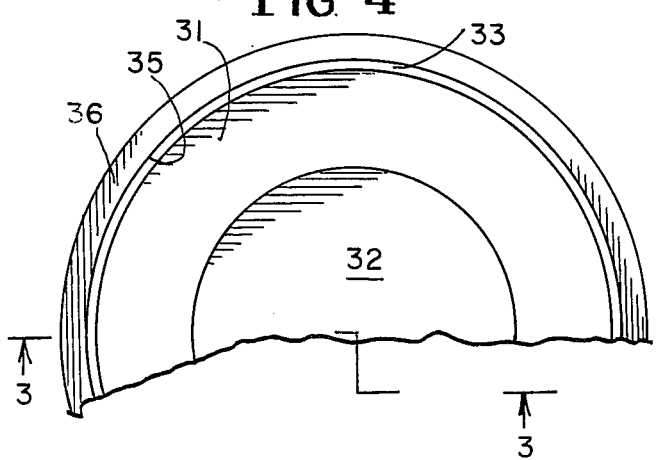
FIG. 4 is a fragmentary top plan view on line 4—4 of FIG. 3.

The form of the invention shown in FIGS. 3 and 4 represents an inversion or reversal of the form shown in FIGS. 1 and 2. Here, lip seal assembly 30 has member 31 mounted on shaft 32. Annular edge lip portion 33 of lip seal element 34 engages interior cylindrical surface 35 of member 36. Thus, member 31 is spaced from cylindrical surface 35 of member 36, and annular edge lip portion 33 seals the space between the two members.

Resilient O-ring 37 engages lip seal element 30 and performs the same functions as O-ring 25 in the form shown in FIGS. 1 and 2. As before, lip seal element 34 and O-ring 37 respectively are received in adjacent annular recesses 38 and 39 of different diameters in member 31.

Figure 5:
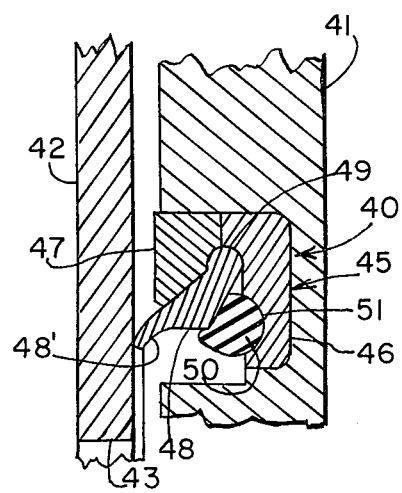
FIG. 5 is a fragmentary sectional view of a lip seal assembly embodying the invention used between a pair of spaced plate members.

FIG. 5 shows a form of lip seal assembly 40 adapted for use between spaced plate members 41 and 42 which have relative movement in rotation, wobble, or reciprocation, or a combination thereof. In the illustrated form, 43 represents the periphery of an opening in plate 42.

Member 45 of assembly 40 is formed in two parts 46 and 47 whereby lip seal element 48 may be received in recess 49 formed when parts 46 and 47 are assembled. Lip seal element 48 has an annular edge lip portion 48$^1$ which bridges the space between plates 41 and 42 and seals against plate 42.

O-ring 50 is received in recess 51 adjacent recess 49 and performs the same functions as the O-rings shown in the other two forms of the invention.

From the above description it is thought that the construction and advantages of this invention will be readily apparent to those skilled in the art. Various changes in detail may be made without departing from the spirit or losing the advantages of the invention.

Having thus described the invention, what is claimed as new and desired to secure by Letters Patent is:

1. A lip seal assembly comprising:
 a first member;
 a second member;
 means mounting said first and second members for relative movement in spaced relation;
 one of said members having a pair of adjacent annular recesses of different effective diameters;
 an annular lip seal element of resilient material seated in one of said annular recesses in said one of said members and having an annular edge lip portion extending into engagement with the other of said members in sealing manner due to deformation of said edge lip portion; and
 an O-ring of resilient material disposed in the other annular recess and exerting bias pressure on said annular lip seal element to hold said lip seal element in sealed relation with said one of said members and to maintain said annular edge lip portion in sealing engagement with said other of said members.

2. The lip seal assembly of claim 1 wherein said annular lip seal element is formed of Teflon plastic material.

3. The lip seal assembly of claim 1 wherein said O-ring is formed of Viton elastomer.

4. The lip seal assembly of claim 1 wherein said annular lip seal element is formed of Teflon plastic material and said O-ring is formed of Viton elastomer.

5. The lip seal assembly of claim 1 wherein said member having said pair of adjacent annular recesses has an annular flange at the entrance to said other annular recess, whereby said O-ring is secured in said recess and is effective to retain all parts in assembled relation.

* * * * *